US009876843B2

(12) United States Patent
Makela

(10) Patent No.: US 9,876,843 B2
(45) Date of Patent: Jan. 23, 2018

(54) MOBILE COMMUNICATIONS TERMINAL AND METHOD

(71) Applicant: Nokia Technologies Oy, Espoo (FI)

(72) Inventor: Mikko K Makela, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/471,347

(22) Filed: Aug. 28, 2014

(65) Prior Publication Data

US 2015/0180937 A1    Jun. 25, 2015

Related U.S. Application Data

(63) Continuation of application No. 10/912,968, filed on Aug. 6, 2004, now Pat. No. 8,832,595.

(51) Int. Cl.
| | |
|---|---|
| *G06F 15/177* | (2006.01) |
| *H04L 29/08* | (2006.01) |
| *G06F 3/0481* | (2013.01) |
| *H04M 1/725* | (2006.01) |
| *G06F 3/0484* | (2013.01) |
| *H04L 12/26* | (2006.01) |
| *G06F 15/00* | (2006.01) |

(52) U.S. Cl.
CPC .......... *H04L 67/06* (2013.01); *G06F 3/0481* (2013.01); *G06F 3/04842* (2013.01); *H04L 43/10* (2013.01); *H04L 67/10* (2013.01); *H04M 1/72522* (2013.01); *H04M 1/72547* (2013.01); *H04M 1/72561* (2013.01)

(58) Field of Classification Search
CPC ..... H04L 41/22; H04L 41/12; H04L 12/2602; H04L 43/00; H04L 43/045
See application file for complete search history.

(56) References Cited

U.S. PATENT DOCUMENTS

| | | | |
|---|---|---|---|
| 5,528,744 A | 6/1996 | Vaughton | |
| 5,892,511 A | 4/1999 | Gelsinger et al. | |
| 6,175,840 B1 * | 1/2001 | Chen | G06F 17/30014 707/E17.013 |
| 6,385,596 B1 * | 5/2002 | Wiser | G06F 21/10 369/84 |
| 6,639,687 B1 | 10/2003 | Neilsen | |

(Continued)

FOREIGN PATENT DOCUMENTS

| | | |
|---|---|---|
| CA | 2267549 | 9/2000 |
| EP | 1 278 127 A1 | 1/2003 |

(Continued)

OTHER PUBLICATIONS

"Application-Initiated Multitasking and Queued Task Recognition," Mar. 1, 1989, IBM Technical Disclosure Bulletin, IBM Corp. New York, US, pp. 355-356, XP000051423.

(Continued)

*Primary Examiner* — Nicholas Augustine
(74) *Attorney, Agent, or Firm* — Alston & Bird LLP

(57) ABSTRACT

A method for operating a graphical user interface of a computer terminal running multiple asynchronous simultaneous tasks. The progress of the tasks is shown in a list in an information window. The content and visibility of the list determines the type of user interaction defined by the terminal when one of the tasks reaches a predetermined stage of completion.

18 Claims, 14 Drawing Sheets

(56) References Cited

U.S. PATENT DOCUMENTS

| | | | | |
|---|---|---|---|---|
| 6,990,534 | B2* | 1/2006 | Mikhailov | G06F 17/30861 707/E17.107 |
| 7,017,120 | B2* | 3/2006 | Shnier | G06F 17/30017 700/94 |
| 2001/0055017 | A1 | 12/2001 | Ording | |
| 2002/0049853 | A1 | 4/2002 | Chu et al. | |
| 2002/0083025 | A1 | 6/2002 | Robarts et al. | |
| 2002/0133491 | A1* | 9/2002 | Sim | G06F 17/30067 |
| 2002/0186257 | A1 | 12/2002 | Cadiz et al. | |
| 2004/0015610 | A1* | 1/2004 | Treadwell | H04L 12/581 709/246 |
| 2005/0107073 | A1* | 5/2005 | Cheiky | H04M 1/72522 455/414.2 |
| 2006/0080103 | A1* | 4/2006 | Van Breemen | G06F 17/30017 704/270 |
| 2006/0168101 | A1 | 7/2006 | Mikhailov et al. | |

FOREIGN PATENT DOCUMENTS

| | | |
|---|---|---|
| JP | H05-189182 A | 7/1993 |
| JP | 2004 191517 A | 7/2008 |
| WO | WO 94/11804 A1 | 5/1994 |
| WO | WO 2005/029312 A1 | 3/2005 |

OTHER PUBLICATIONS

"Presenting Messages on an Object That is Not currently Being Worked on," Nov. 1, 1992, IBM Technical Disclosure Bulletin, IBM Corp, New York, US; pp. 99-101, XP000314078.
Allowance for Mexican Application No. MX/a/2007/000190 dated Apr. 15, 2011.
Communication/Intention to Grant for European Application No. 05 762 538.6 dated Dec. 16, 2010.
Download Managers; XP002364503; available at: www.pcmag.com/print_article2/0, [retrieved Jan. 25, 2006].
Examination for Mexican Application No. MX/a/2007/000190 (undated).
FlashGet, PCDIY, Issue 3, 2001 pp. 95-97 EASKY dated Dec. 31, 2001 (retrieved Oct. 13, 2009). Retrieved from the internet: <URL:http://10.1.10.120/kns50/detail.aspx?QueryID=16&CurRec=3>. 4 pages.
International Preliminary Examination Report for PCT/EP2005/007920 dated Feb. 15, 2007.
Lightning Download—Screenshots; XP002364502; available at: www.lightningdownload.com/screens.shtml; /new.shtml; /whatsnew.shtml [retrieved Jan. 25, 2006].
Lightning Download 1.1.1—Reviews by PC Magazine [online] [retrieved Oct. 15, 2009]. Retrieved from the Internet: <URL:http://www.pcmag.com/article2/0%2C2817^2C1094914%2C00.asp>. (dated Jun. 17, 2003) 3 pages.
Lightning Download: Accelerate, Manage, Schedule you Downloads [online] [retrieved Sep. 23, 2009]. Retrieved from the Internet: <URL: http://www.lightningdownload.com/screens.shtml>. 5 pages.
Lightning download: Accelerate, Manage, Schedule your Downloads [online] [retrieved Dec. 5, 2008]. Retrieved from the Internet: <URL:http://web.archieve.org/web/20040604054150/http://www.lighting>. (dated 2003) 3 pages.
Notice of Allowance for U.S. Appl. No. 10/912,968 dated Feb. 28, 2014.
Notice of Allowance for U.S. Appl. No. 10/912,968 dated May 2, 2014.
Office Action for Chinese Application No. 200580025959.X dated Jul. 25, 2008.
Office Action for Chinese Application No. 200580025959.X dated Jun. 2, 2011.
Office Action for Chinese Application No. 200580025959.X dated May 3, 2012.
Office Action for Chinese Application No. 200580025959.X dated Oct. 30, 2009.
Office Action for European Application No. 05 762 538.6 dated Aug. 1, 2007.
Office Action for European Application No. 05 762 538.6 dated Jan. 7, 2009.
Office Action for Mexican Application No. MX/a/2007/000190 dated Dec. 3, 2010.
Office Action for Mexican Application No. MX/a/2007/000190 dated Jun. 23, 2010.
Office Action for U.S. Appl. No. 10/912,968 dated Jan. 10, 2008.
Office Action for U.S. Appl. No. 10/912,968 dated Jul. 27, 2007.
Office Action for U.S. Appl. No. 10/912,968 dated Jun. 21, 2013.
Office Action for U.S. Appl. No. 10/912,968 dated Mar. 3, 2009.
Office Action for U.S. Appl. No. 10/912,968 dated Sep. 18, 2008.
Office Action for U.S. Appl. No. 10/912,968 dated Sep. 18, 2013.
Search Report and Written Opinion for PCT/EP2005/007920 dated Jun. 7, 2006.
Simultaneous Downloading of Multiple Files (undated), [online][retrieved Oct. 4, 2012]. Retrieved from the Internet: <URL:http://www.netline.ch/support/info/aspcomp/safileup/prog_g_clientmultidownx.htm> 4 pages.
Summons to Attend Oral Proceedings for European Application No. 05 762 538.6 dated Feb. 23, 2010.
FlashGet—The Best Download Manager (Download Movies mp3 faster) [online][retrieved Jul. 21, 2007]. Retrieved from the Internet: <URL:http://web.archive.org/web/20040204234648/http://flashget.com/>. 4 pages.

* cited by examiner

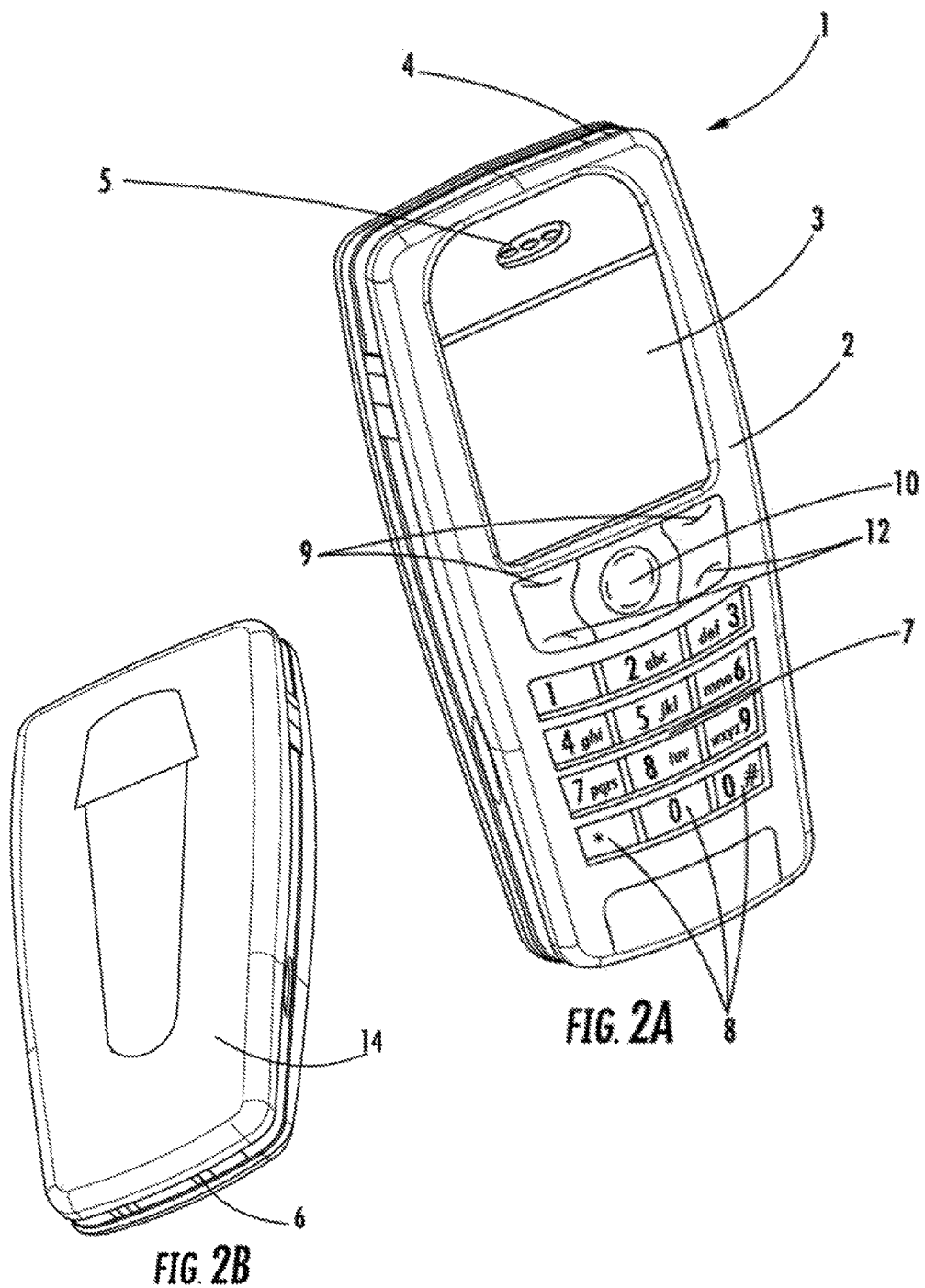

MOBILE COMMUNICATIONS TERMINAL AND METHOD

The present application is a continuation of U.S. application Ser. No. 10/912,968, filed Aug. 6, 2004, the contents of which are incorporated by reference herein in their entirety.

TECHNOLOGICAL FIELD

The present invention relates to methods for operating a user interface of a computer terminal running multiple simultaneous tasks. The invention relates further to methods for operating a graphical user interface of a computer terminal, in particular a mobile communication terminal, capable of running multiple simultaneous downloads, uploads or print jobs, as well as methods for handling downloads from one or more servers onto a computer terminal capable of running multiple simultaneous downloads.

BACKGROUND ART

Mobile communication terminals, e.g. mobile phones, personal digital assistants (PDA) or the like have developed into computer terminals that offer almost the same functionality as a computer workstation or IJC. These mobile terminals include office applications, internet browsers and game platforms, etc.

Many of the presently most advanced mobile communication terminals are operated with a Graphical User Interface (GUI) that resembles the GUIs used in workstations and PCs. However, mobile communication terminals generally lack a pointer device such as a mouse and have a significantly smaller available display area than computer workstations and PCs.

Proper navigation between active windows is sometimes very difficult to provide in usable way without a pointing device.

In a situation where an application on a mobile communication terminal has multiple active windows for asynchronous, simultaneously run tasks, but which terminal does not have enough screen area to adequately show multiple windows at the same time, or even no area to show these windows as buttons. Under these circumstances users sometimes miss the overview of the tasks running on their mobile communication terminal, possibly resulting in a feeling of lack of control.

On advanced mobile terminals devices where data transfer rates are high (3G, EDGE, WLAN) relative to the available memory space a user could easily initiate the simultaneous download of a number of relatively large files, e.g. music files containing all the songs of an album. The total space required for these files may not be available on the terminal and the user may end up having paid for the to be downloaded files and for the data transfer costs in vane.

DISCLOSURE OF THE INVENTION

The present invention provides method for operating a user interface of a computer terminal running multiple simultaneous tasks that each can go through one or more given changes in status, comprising the steps of: monitoring the status of the tasks, presenting information regarding the status of the tasks via the user interface, determining if the information regarding the status of the task concerned is perceptible by a user when any of the tasks changes status, and presenting a separate confirmation indicating that the task concerned has changed status if the information regarding the status of the task concerned is not perceptible by the user when the task concerned changes status.

The present invention provides further a method for operating a graphical user interface of a computer terminal running multiple asynchronous simultaneous tasks that each can go through one or more given changes in status, comprising the steps of: monitoring the status changes of the tasks, determining if a window with information regarding the status of the task concerned is visible on the graphical user interface when any of the tasks changes status, and displaying a confirmation dialog indicating that the task concerned has changed status if no window with information regarding the progress of the task concerned is being displayed on the graphical user interface when the task concerned has changed status.

The present invention provides further a method for operating a graphical user interface of a computer terminal capable of running multiple asynchronous simultaneous downloads, comprising the step of displaying an information window including a list of the downloads in progress.

The present invention provides further a method for handling downloads from one or more servers onto a computer terminal capable of running multiple asynchronous simultaneous downloads, comprising the steps of: checking the available memory space in the computer terminal before initiating a download, deducting the space required for previously started downloads from said available memory space to obtain the effectively available memory space, obtaining or estimating the size of the to be downloaded file, and canceling the download if the effectively available memory space is smaller than the size of the to be downloaded file.

The present invention also provides a method for operating a graphical user interface of a computer terminal running multiple asynchronous simultaneous tasks that each can go through one or more given changes in status, comprising the steps of: monitoring the status of said tasks, displaying a window with a list with information regarding the status of the tasks, and displaying a confirmation dialog indicating that the task concerned has changed status if the list contains information regarding more than one task or if the list has not been visible throughout the progress of the task concerned, when the task concerned changes status.

BRIEF DESCRIPTION OF THE DRAWINGS

In the following detailed portion of the present description, the invention will be explained in more detail with reference to the exemplary embodiments shown in the drawings, in which:

FIGS. 2A and 2B illustrates a perspective front and rear view of a preferred embodiment of a mobile terminal according to the invention;

DETAILED DESCRIPTION

Figure 1:
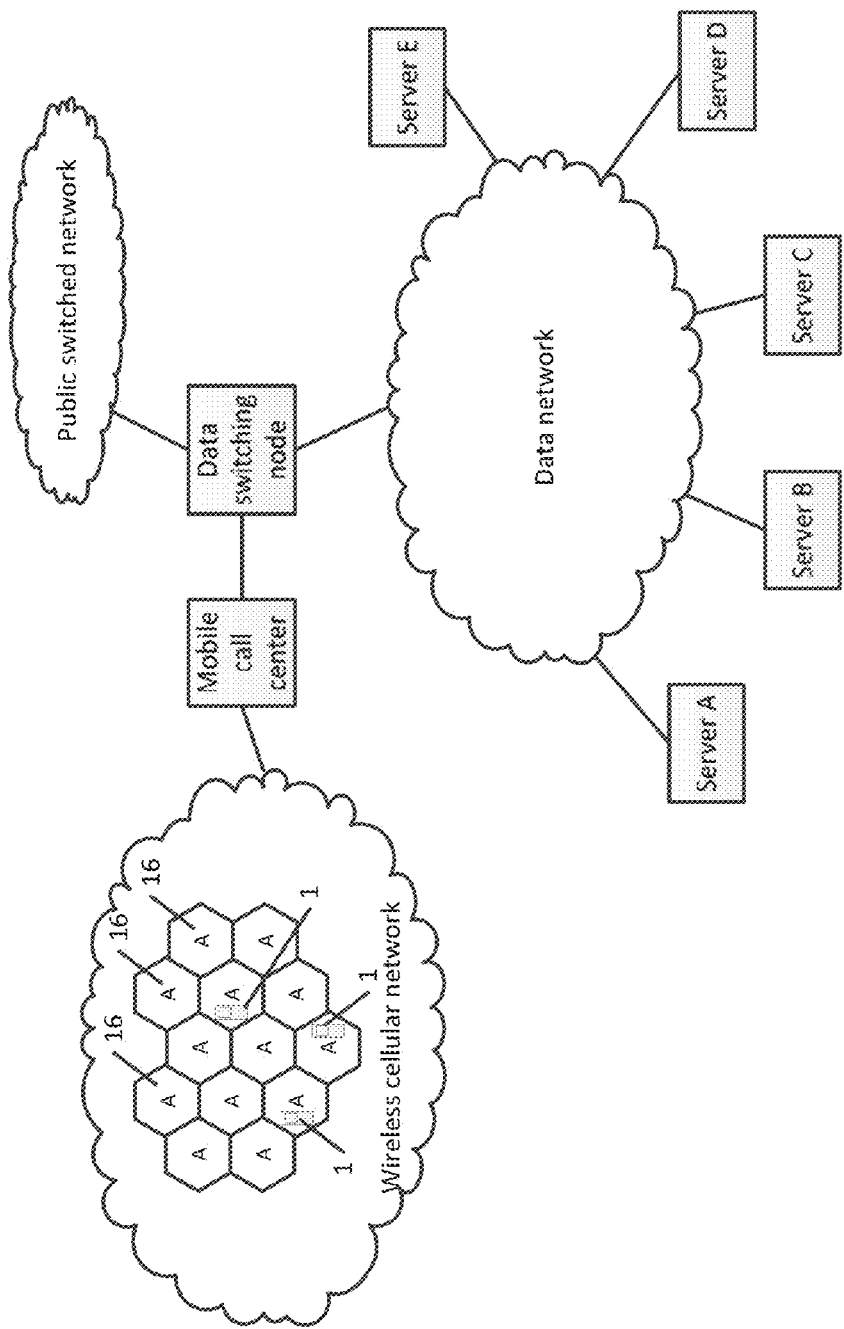
FIG. 1 shows the architecture of a wireless cellular communication network for use with the present invention.

FIG. 1 illustrates a network architecture, for a telecommunication system for use with the present invention. As shown, the telecommunication system includes a wireless cellular network and a data network connected to a public switched network. The wireless cellular network can be implemented in a conventional wireless cellular telephone network that has been enhanced to carry data. A wireless network capable of carrying circuit-switched data can be used for this purpose. More preferably, however, the wireless cellular network provides a packet-switched data service. An example of a wireless infrastructure includes UMTS (Universal Mobile Telephone System), a $3^{rd}$ Generation wireless system based on GSM (Global System for Mobile communications). GSM adds a packet network overlay known as GRPS (GSM Packet Radio Service) to a wireless circuit voice network.

The data network of FIG. 1 can be implemented using a conventional packet data network based on the IP (Internet Protocol) and/or ATM (Asynchronous Transfer Mode) protocols, and also has wireless network access capability.

A number of servers A,B,C,D,E providing HTML, XHTML, WML or WAP pages are connected to the data network. These servers may, further to content that can be displayed on a page, provide other downloadable items, such as images, sound files, applications etc.

A mobile communication terminal according to the invention in the form of, a hand portable phone, preferably a cellular/mobile phone, will be described by the preferred embodiments. The invention can however, also be carried out with any other computer terminal such as a Personal Digital Assistant (PDA).

FIGS. 2A and 2B shows a mobile phone according to the invention. The mobile phone 1 comprises a user interface having a housing 2, a display 3, an on/off button 4, a speaker 5 (only the openings are shown), and a microphone 6 (only the opening is shown). The phone 1 according to the preferred embodiment is adapted for communication via a cellular network, such as the GSM 900/1800 MHz network, but could just as well be adapted for use with a Code Division Multiple Access (CDMA) network, a 3G network, or a TCP/IP-based network to cover a possible VoIP-network (e.g. via WLAN, WIMAX or similar).

The keypad has a first group 7 of keys 8 as alphanumeric keys, by means of which the user can enter a telephone number, write a text message (SMS), write a name (associated with the phone number), etc. Each of the twelve alphanumeric keys 8 is provided with a figure "0-9" or a sign "#" or "*", respectively. In alpha mode each key is associated with a number of letters and special signs used in the text editing.

The keypad 2 has additionally a second group of keys comprising two soft-keys 9, two call handling keys 12, and a 5-way navigation key 10 (up, down, left right and center: select/activate). The function of the soft-keys depends on the state of the phone and navigation in the menu is performed by using the navigation-key. The present function of the softkeys 9 is shown in separate fields (soft labels) in the display 3, just above keys 9. The two call handling keys 12 are used for establishing a call or a conference call, terminating a call or rejecting an incoming call. This key layout is characteristic for e.g. the Nokia 6610™ phone.

The arrow key 10 is a five-way key which can be used for cursor movement, scrolling and selecting and is placed centrally on the front surface of the phone between the display 3 and the group of alphanumeric keys 7. A releasable rear cover 14 gives access to the battery pack that in the back of the phone supplies electrical power for the electronic components of the mobile phone.

The mobile phone has a flat display 3 that is typically made of an LCD with optional back lighting, such as a TFT matrix capable of displaying color-images.

Figure 3A:
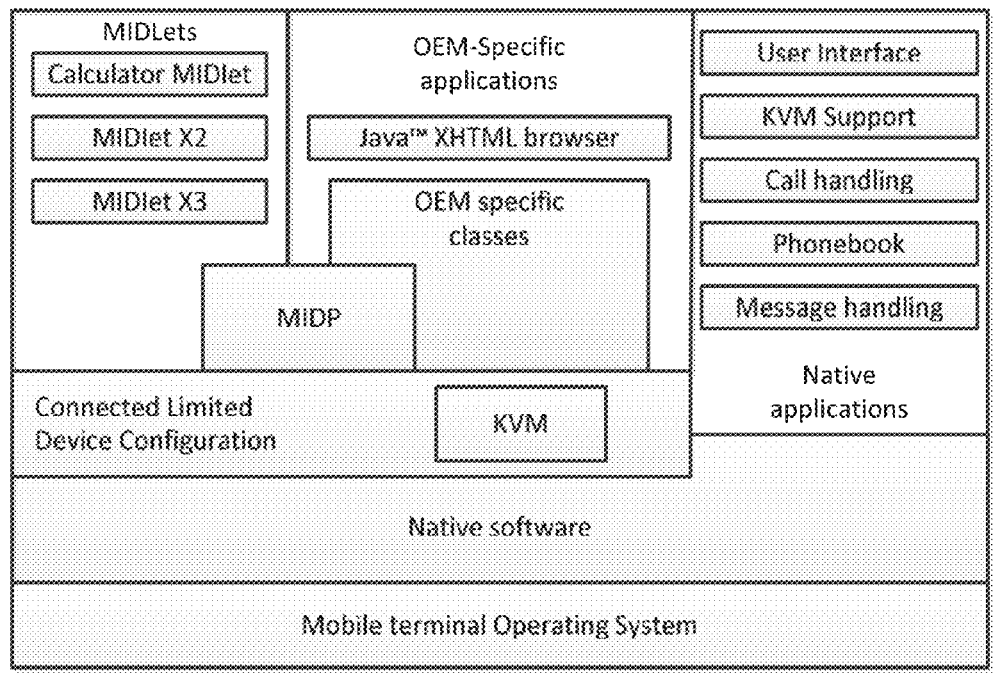
FIG. 3A is a block diagram illustrating the general architecture of a mobile phone in accordance with the present invention.

FIG. 3a illustrates in block diagram form the, general architecture of a mobile phone 1 constructed in accordance with the present invention. A processor 18 controls the communication with the cellular network via the transmitter/receiver circuit 19 and an internal antenna 20. A microphone 6 transforms the user's speech into analogue signals, the analogue signals formed thereby are A/D converted in an A/D converter (not shown) before the speech is encoded in a digital signal processing unit 14 (DSP). The encoded speech signal is transferred to the processor 18, which e.g. supports the GSM terminal software. The processor 18 also forms the interface to the peripheral units of the apparatus, including a RAM memory 17a and a Flash ROM memory 17b, a SIM card 16, the display 3, the IrDA controller 35, the Bluetooth controller 25, the serial port 36,61 and the keypad controller 29, external RAM 27 and keypad 2 (as well as data, power supply, etc.). The digital signal-processing unit 14 speech-decodes the signal, which is transferred from the processor 18 to the speaker 5 via a D/A converter (not shown).

Figure 3B:
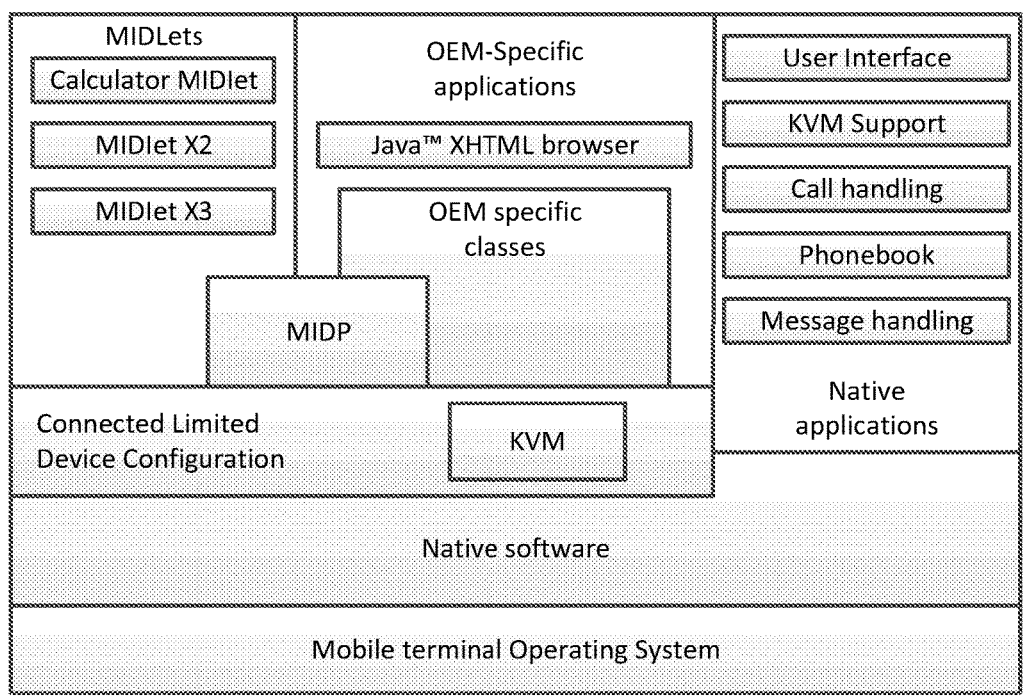
FIG. 3B is a diagram illustrating the software architecture of the mobile phone shown in FIGS. 2A and 2B.

FIG. 3b illustrates the software architecture of the mobile phone 1. The software architecture comprises an operating system, in a preferred embodiment the Symbian™ 7.0 OS that provides the platform for the native software. The native software comprises a number of native applications of which a few can be mentioned: User interface, KVM support, call handling, phone book, message handling and a MIDlet database. The listed native applications are, however merely exemplary, there could be more as well as fewer native applications.

A Connected Limited Device Configuration (CLDC) provides the runtime environment for Java™ applications. CLDC is one of the most appropriate configurations for mobile phones available for Java™, since it is tailored for devices with 160-512 KB memory battery powered, slow, possibly intermittent, connection.

The CLDC comprises a K Java™ Virtual Machine (KVM) and a set of libraries and Application Program Interfaces (APIs). The libraries and APIs are specified in the Mobile Information Device Profile (MIDP) sitting on top of the CLDC. The MIDP is a vertical extension of CLDC. Together they provide a run-time environment for Java™

Applets and MIDlets (MIDlet: an application written for the Mobile Information Device profile MIDP)) on the mobile phone concerned.

In the present embodiment a Java™ XHTML micro browser applet has been installed by the OEM. The micro browser supports the XML and HTML XHTML specification as well as the WAP and WML documents. The browser can download and show webpages in the above mentioned formats.

According to another preferred embodiment the browser is a Series 60 application implemented for the Symbian OS.

Figure 3C:
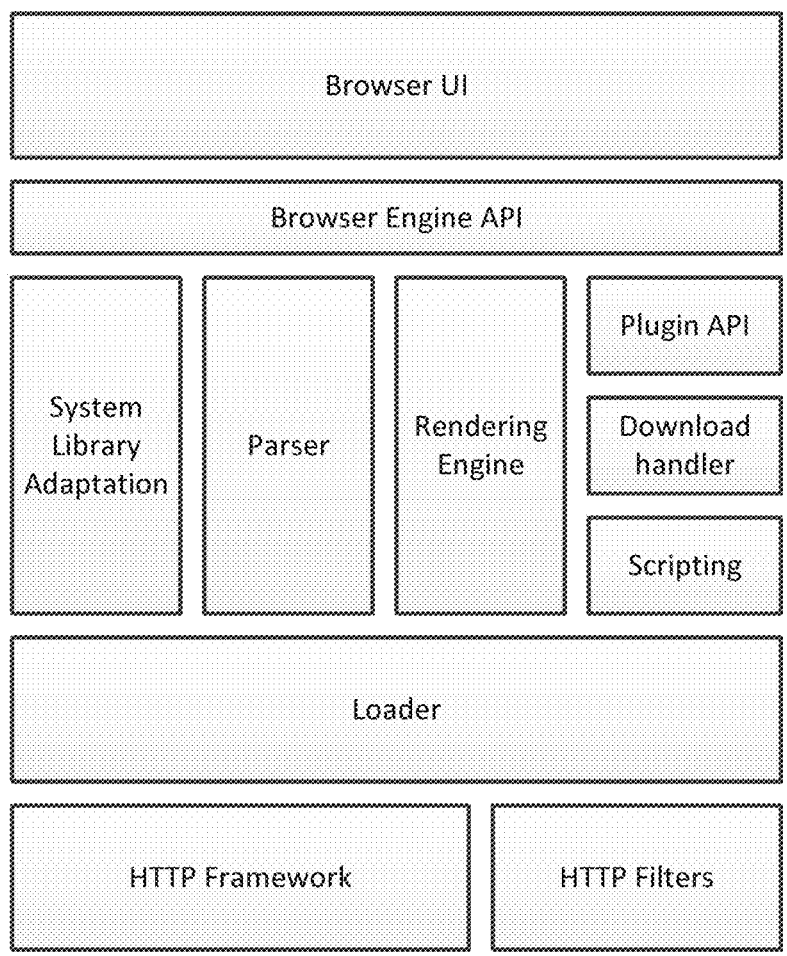
FIG. 3C is a diagram showing the architecture of a micro browser application.

Referring now to FIG. 3C the architecture of the Series 60 micro browser is illustrated. The architecture of the Java browser is substantially identical with that of the Series 60 browser. The browser UI takes care of all the user interface aspects except rendering of a document, e.g. options menu functions are provided by this layer. The browser engine API interfaces between browser UI and lower level implementation. The system library adaptation handles communication between operating system and browser. The Parser reads (X)HTML markup, and processes, it into the format that the browser internally uses. The Rendering Engine draws (renders) pages on the screen. The plug-in API provides interface between the browser and plug-in objects (e.g. Macromedia Flash® content on the page) embedded into a page. Scripting handles ECMA/JavaScript on page and the loader together with the HTTP framework and HTTP filters take care of downloading of a page. The download handler, together with the loader, HTTP framework and HTTP filters, takes care of downloading of files that cannot be displayed on a page. The download handler application can be called by other applications installed on the mobile phone.

Figure 3D:
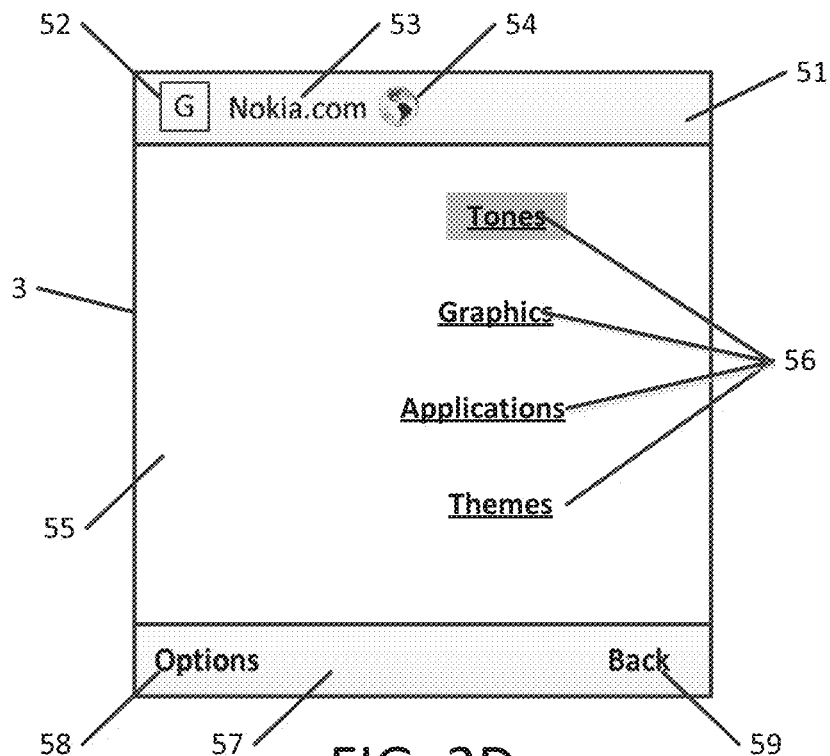
FIGS. 3D to 3F are screenshots of webpages shown by the micro browser.

FIG. 3D shows a screenshot of a webpage rendered on the display 3 by the micro browser. The upper bar 51 shows the logo 52 for the GPRS connection and the URL 53 of the webpage. A rotating globe 54 is shown in the upper bar 51 when a webpage is being downloaded. In the main area 55, text, graphics and hyperlinks 56 are displayed (only hyperlinks are shown in FIG. 3D). One of the hyperlinks 56 is highlighted (the first link on the page is highlighted per default).

Figure 3E:
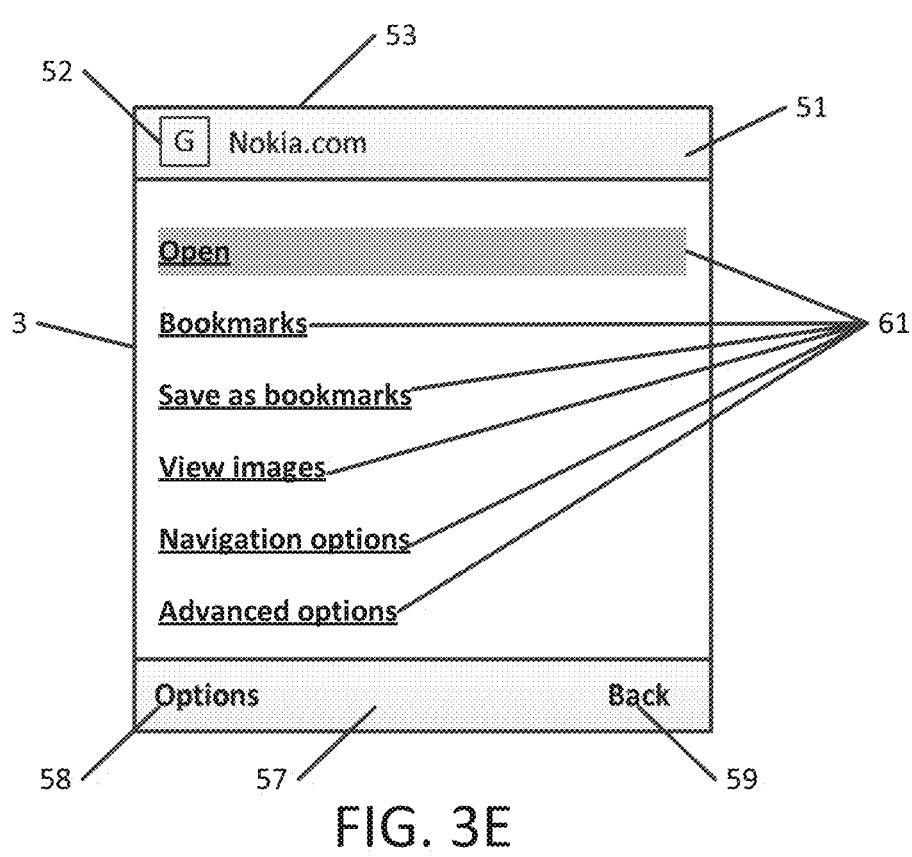
Figure 3F:
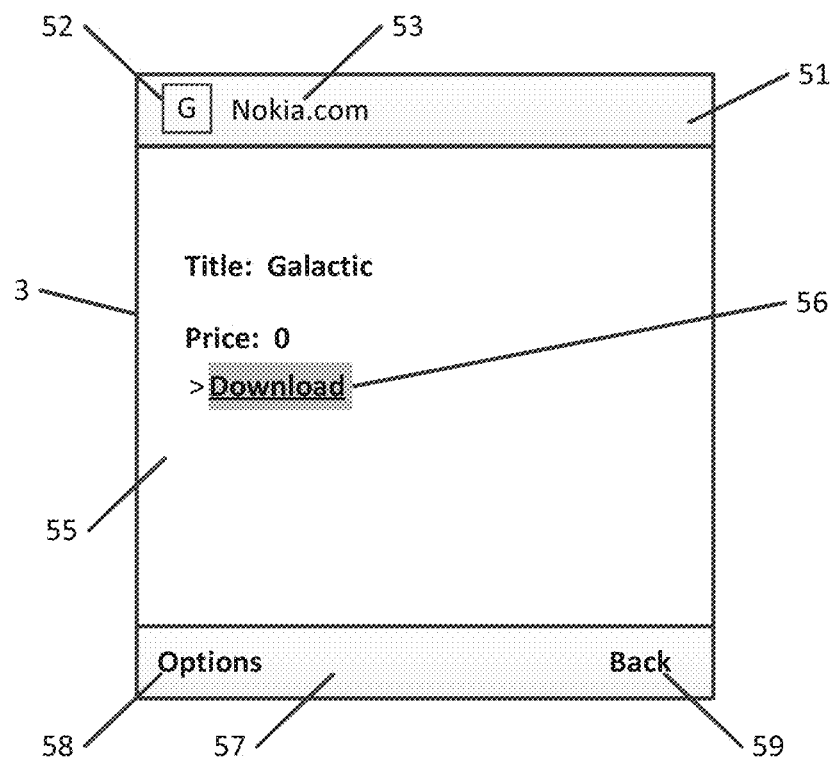

The web pages displayed in the browser contain hyperlinks 56. The user can jump from hyperlink to hyperlink by pressing the navigation pad 10 which will thus become highlighted. The highlighted hyperlink 56 can be activated by pressing centrally on the navigation pad 10 or, (as shown in FIG. 3E) by pressing the left softkey "options", which results in a list 61 of selectable items including the item "Open"). The highlighted hyperlink is activated and the corresponding webpage downloaded. FIG. 3F is a screenshot of a webpage including a link 56 to a file to be downloaded, i.e. a file of a type that cannot be presented on a page in the browser.

Figure 4A:
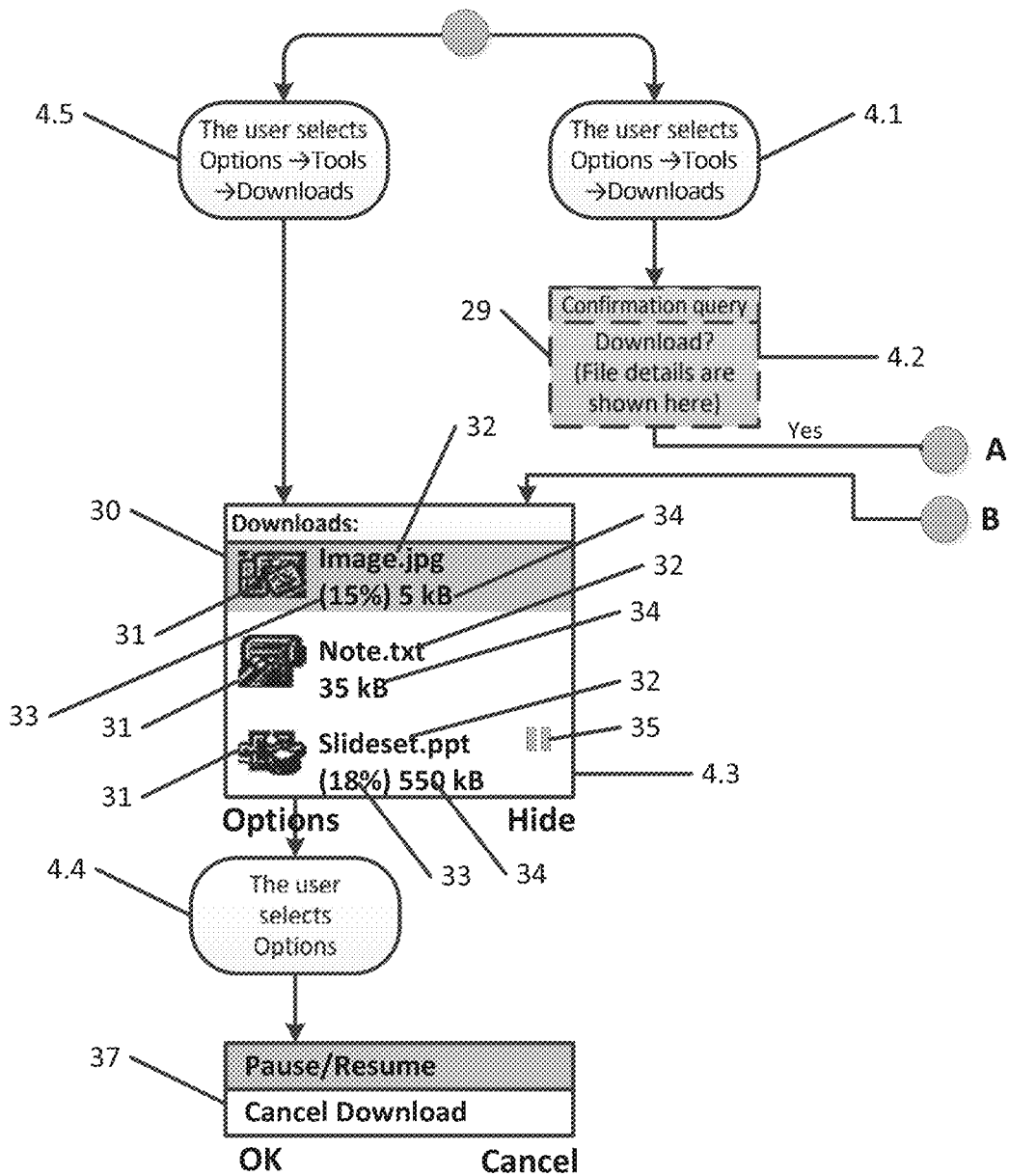
FIG. 4A is a flow chart illustrating the start and progress of download procedures.

With reference to FIG. 4A the download procedure of files that cannot be presented on a page is illustrated. While being connected to a remote server via the browser the user can initiate (step 4.1) a download by activating a hyperlink that activates a download. The micro browser responds (step 4.2) with a confirmation query 29 "Download?" followed by the file details/name. If the user confirms the query 29 by pressing the left softkey "Yes" a subroutine for checking that there is sufficient is started. The subroutine is described in detail below with reference to FIG. 5. When the subroutine confirms that there is sufficient memory space available for the download, the download starts and an information window 30 pops up (step 4.3).

The information window 30 shows a list with all downloads currently in progress (in the browser or in some other application using the download handler), paused or completed in the current browser instance. The list includes three columns and shows (as far is the information is available) for each download listed:

the application shell icon 31, shown in the first column;
the name of the file 32 being downloaded, shown in the central column;
the download progress 33 in percentage, shown in parenthesis in the central column below the name of the file;
the amount of downloaded data 34, shown in the central columns below the name of the file 32;
an external memory icon 35, shown in the last column.

The name of the file in download is taken from descriptor of the downloaded file or from the document from which the file download was initiated.

Figure 4B:
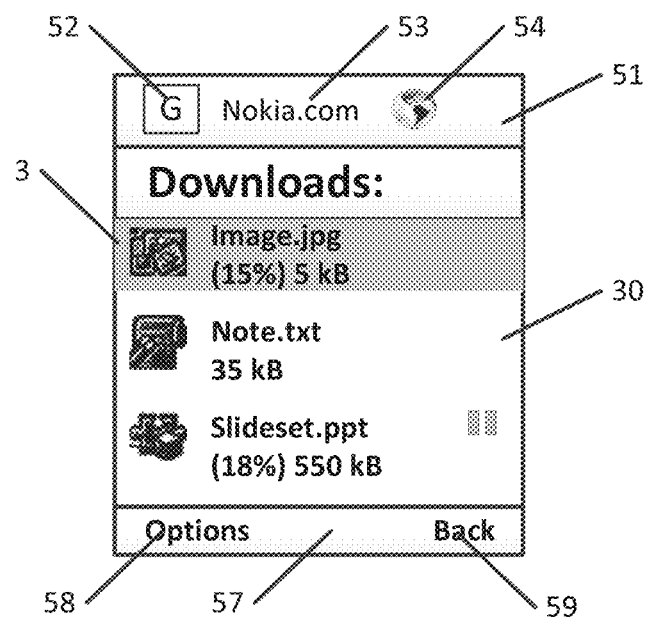
FIG. 4B is a screenshot of a step of the flowchart of FIG. 4A.

One of the "downloads in the list (default is the first listed download) is highlighted. By pressing the "Up" and "Down" navigation key 10 the user can change the download that is highlighted. When the information window is the topmost window, the function of the softkeys 9 is "Options" and "Hide". As illustrated in FIG. 4B, the information window 30 covers a major part of the display 3. Pressing the right softkey "Hide" sends the information window 30 to the background and allows the user to see and use other applications, i.e. the viewer of an image downloaded earlier.

Pressing the left softkey "Options" (step 4.4) calls a pop-up window (step 4.5) with a list of selectable items that includes the items "Pause/Resume" and "Cancel download". The function of the softkeys 9 has changed to "OK" and "Cancel". Selecting "Pause/Resume" with the navigation key 10 and pressing the left softkey 9 "OK" pauses the highlighted download when it was not already paused, and resumes the highlighted download when it was already paused. Pressing "Cancel" closes the pop-up window.

The user can recall the information window 30 when it is in the background. To do so, the user presses the left softkey 9 "Options", resulting in a list of selectable items being shown including "Tools". Selecting "Tools" and pressing the left softkey 9 "Select" results in another list with selectable menu items including the item "Downloads". Selecting "Downloads" calls the information window 30 back to the front (step 4.5).

Figure 5:
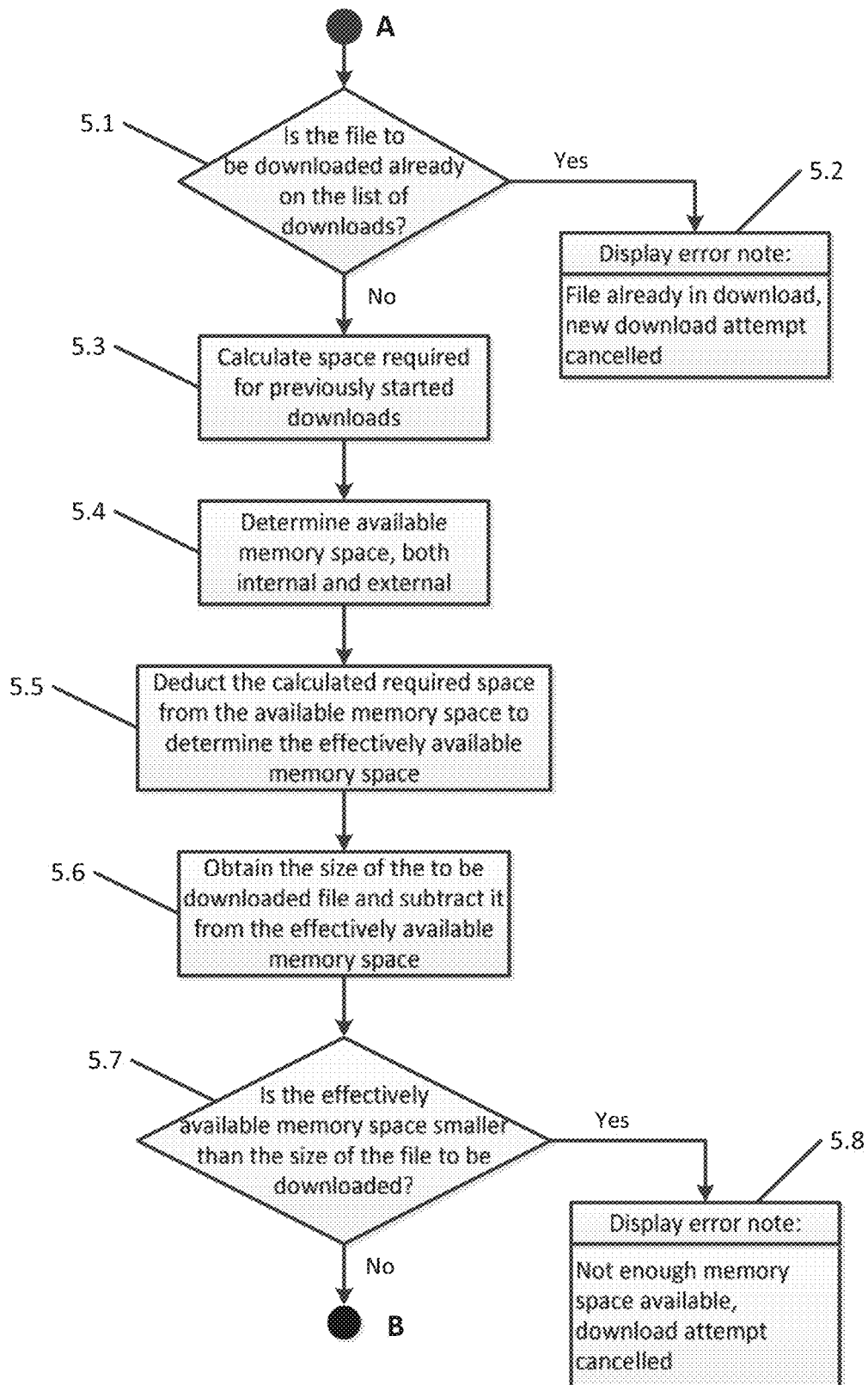
FIG. 5 is a flowchart illustrating a subroutine of the flowchart shown in FIG. 4A.

Referring now to FIG. 5 the subroutine for checking the available memory space is described. In step 5.1 it is checked if the file that the user requests to download is not already on the list of downloads. If the file is already on the list an error message is shown (step 5.2) "File already in download, new download attempt cancelled".

If the file is not already on the list, the space required for previously started download is calculated (step 5.3).

The space required for each previously started download is calculated on the basis of the size of the part of the download concerned that has not yet been downloaded. In step 5.4 the available memory space is determined, first the internal RAM 17a and next the external RAM 27.

In step 5.5 the total space required for previously stated downloads is subtracted from memory space available at the moment, to obtain the effectively available memory space.

In step 5.6 the size of the file to be downloaded is queried from the server. If the server does not provide the information the file size is estimated, e.g. by using some default value, like 100 kB or 10% of available memory.

In step 5.7 it is calculated whether or not the effectively available memory space is smaller than the size of the file to be downloaded. If the effectively available memory space is not smaller than the size of the file to be downloaded the subroutine returns at B to the flowchart of FIG. 4A. If the effectively available memory space is smaller than the size of the file to be downloaded an error note (step 5.8) is displayed: "Not enough memory space, available, download, attempt cancelled".

Figure 6:
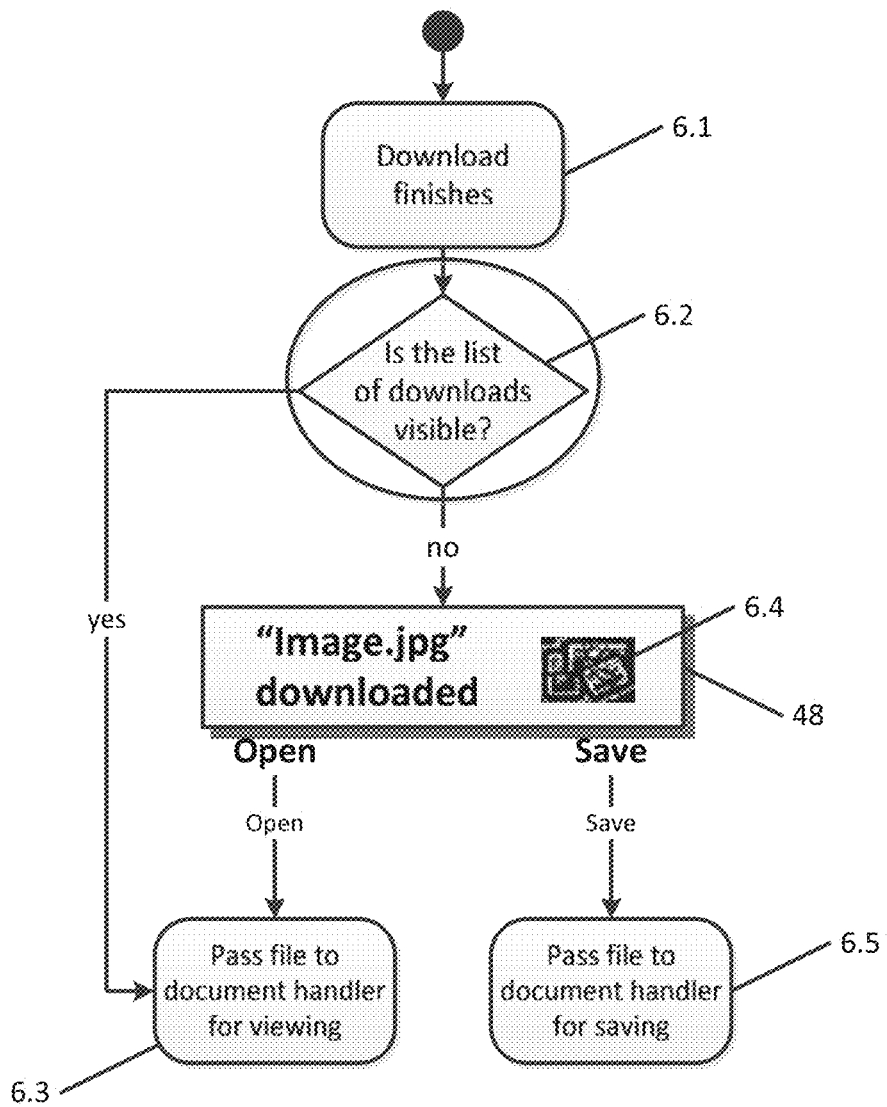
FIG. 6 is a flow chart illustrating the procedure upon completion of one of the downloads according to a first embodiment.

With reference to FIG. 6 a first embodiment of the procedure upon completion of a download is illustrated. In step 6.1 one of the downloads finishes. In step 6.2 it is determined if the list of downloads in the information window 30 is presently visible. The visibility is considered to be positive if the information window 30 is the topmost window. If list is visible indeed, the downloaded file is passed to the document handler for viewing (step 6.3).

If the list is not visible, a confirmation query 48 ""Filename" downloaded" is shown (step 6.4). Simultaneously the function of the softkeys 9 changes to "Open" and "Save". Pressing of the left softkey 9 "Open" causes the file to be passed to the document handler for-viewing (step 6.3). Pressing the right softkey 9 "Save" causes the file to be passed to the document handler for saving (step 6.5).

The procedure above ensures simple and easy user interaction in cases where the user just downloads one item at the time and waits until the whole download has been completed. Because the list of downloads is visible, it is safe to assume that the user understands that the download completed.

If the list of downloads is not visible when download completes (the list might be in the background in the browser, or the user might be using some other application like viewer for the previous download), then the user is provided with confirmation dialog about completed download. This ensures that the user understands that the downloading completed, so (s)he is not taken to viewer application without explanation of the reason for that.

Figure 7:
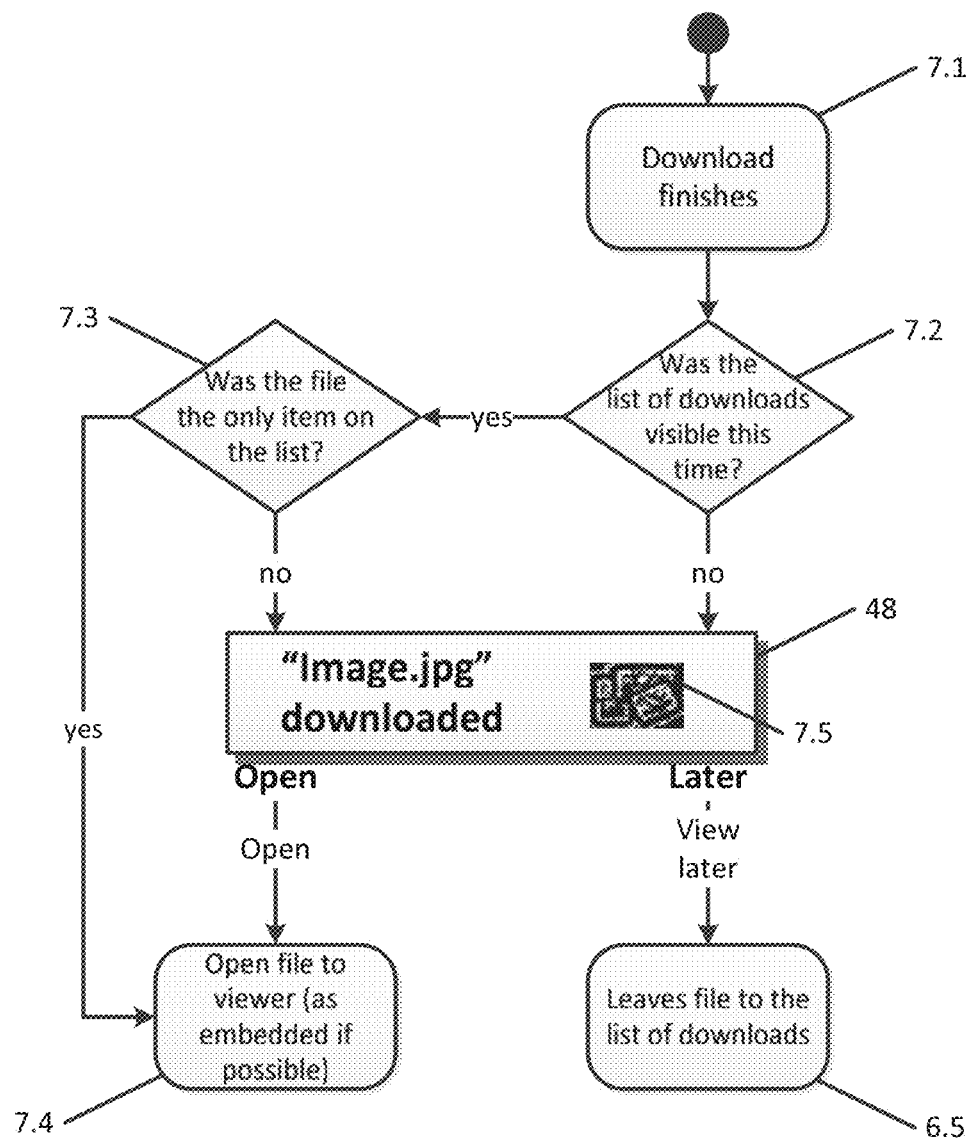
FIG. 7 is a flow chart illustrating the procedure upon completion of one of the downloads according to a second embodiment.

With reference to FIG. 7 a second embodiment of the procedure upon completion of a download is illustrated. In step 7.1 one of the downloads finishes. In step 7.2 it is determined if the list of downloads in the information window 30 was visible throughout the download. The visibility is considered to be positive if the information window 30 was the topmost window during the complete download. If the list was visible all the time indeed, it is determined in step 7.3 if the finished download was the only item on the list of downloads in information window 30. If so, the downloaded file is passed to the document handler for viewing (step 7.4).

If the list was not visible all the time, or if there was more than one item on the list, a confirmation query 48 ""Filename" downloaded" is shown (step 7.5). Simultaneously, the function of the softkeys 9 changes to "Open" and "Save". Pressing the left softkey 9 "Open" causes the file to be passed to the document handler for viewing. Pressing the right softkey 9 "Save" causes the file to be passed to the document handler for saving.

Alternatively, a criterion for deciding not to show the confirmation query 48 could be the fact that the download that finished is the first download on the list. Another criterion for deciding to present a confirmation query, or any other type of confirmation message such as a tone, could be the light conditions around the display. A light sensor (not shown) in the mobile phone 1 could e.g. detect that direct sunlight is falling onto the screen and cause the presentation of a tone or voice message to inform the user that a task has changed status. If the initial status information concerning the status of the tasks is presented in audible form, a separate confirmation regarding a status change is presented in non-audible form when the noise level around the mobile phone detected by the microphone 6 is above a given threshold or if a setting in the mobile phone 1 has disabled all audible notifications.

Figure 8:
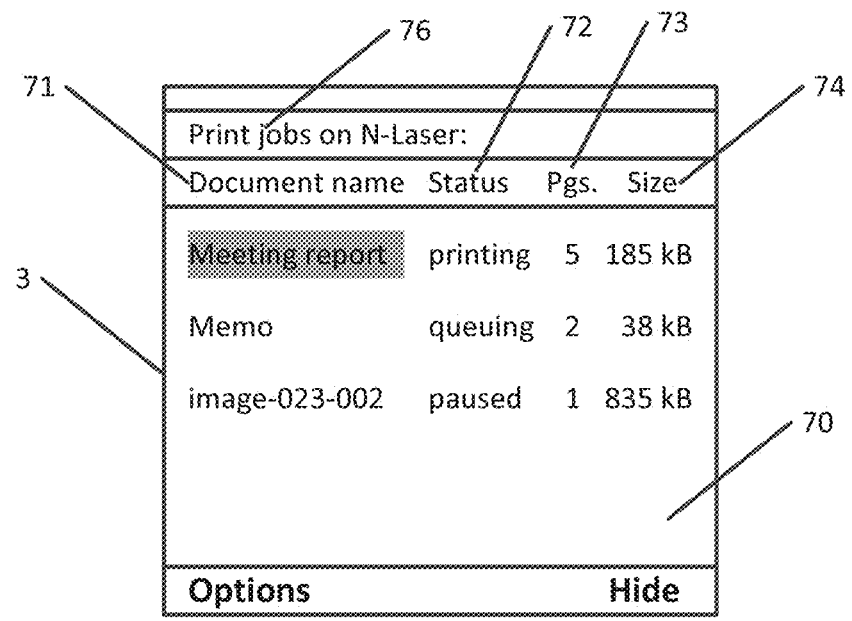
FIG. 8 is screenshot of another preferred embodiment.

FIG. 8 illustrates a screenshot of another preferred embodiment of the invention. In this embodiment the simultaneous tasks are print jobs. Upon each new print job an information window 70 is displayed. The information window 70 includes a title bar 76, and a list with all print jobs currently in progress, paused or completed. The list includes a document name column 71, a status column 72; a pages column 73, and a file size column 74.

One of the print jobs in the list (default is the first listed print job) is highlighted. By pressing the "Up" and "Down" navigation key 10 the user can change the print job that is highlighted. When the information window 70 is the topmost window, the function of the softkeys 9 is "Options" and "Hide". The information window 70 covers a major part of the display 3. Pressing the right softkey 9 "Hide" sends the information window 70 to the background and allows the user to see and use other applications, i.e. the text editor of a document created earlier.

Pressing the left softkey "Options" calls a pop-up window (not shown) with a list of selectable items that includes the items "Pause/Resume" and "Cancel print". The function of the softkeys 9 has changed to "OK" and "Cancel". Selecting "Pause/Resume" with the navigation key 10 and pressing the left softkey 9 "OK" pauses the highlighted print job when it was not already paused and resumes the highlighted print job when it was already paused. Pressing "Cancel" closes the pop-up window.

The user can recall the information window 70 when it is in the background. To do so, the user presses the left softkey 9 "Options", resulting in a list of selectable items being shown including "Tools". Selecting "Tools" and pressing the left softkey 9 "Select" results in another list with selectable menu items including the item "Print jobs". Selecting "Print jobs" calls the information window 70 back to the front.

When the status of a print job changes, e.g. a print job finishes or an error occurs, such as the printer being out of paper, a check is made if the information 70 window is visible, i.e. presently the topmost window.

If information window 70 is visible indeed, no further action is taken.

If the information window 70 is not visible (i.e. is not the topmost window), a confirmation query "Filename: print finished" or "Filename: error, out of paper" is shown. Simultaneously the function of the left softkey 9 changes to "Hide". The right softkey has no function in this situation. Pressing of the left softkey 9 "Hide" closes the confirmation query.

Figure 9:
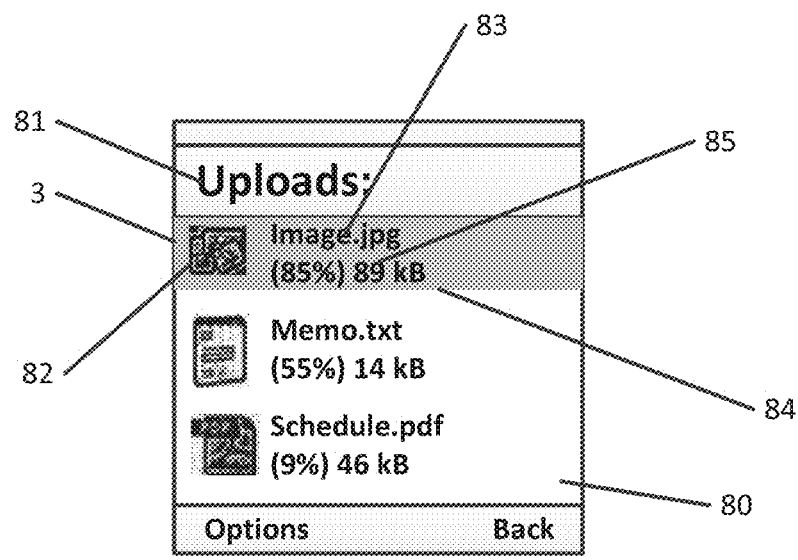
FIG. 9 is screenshot of yet another preferred embodiment.
Figure 3A:
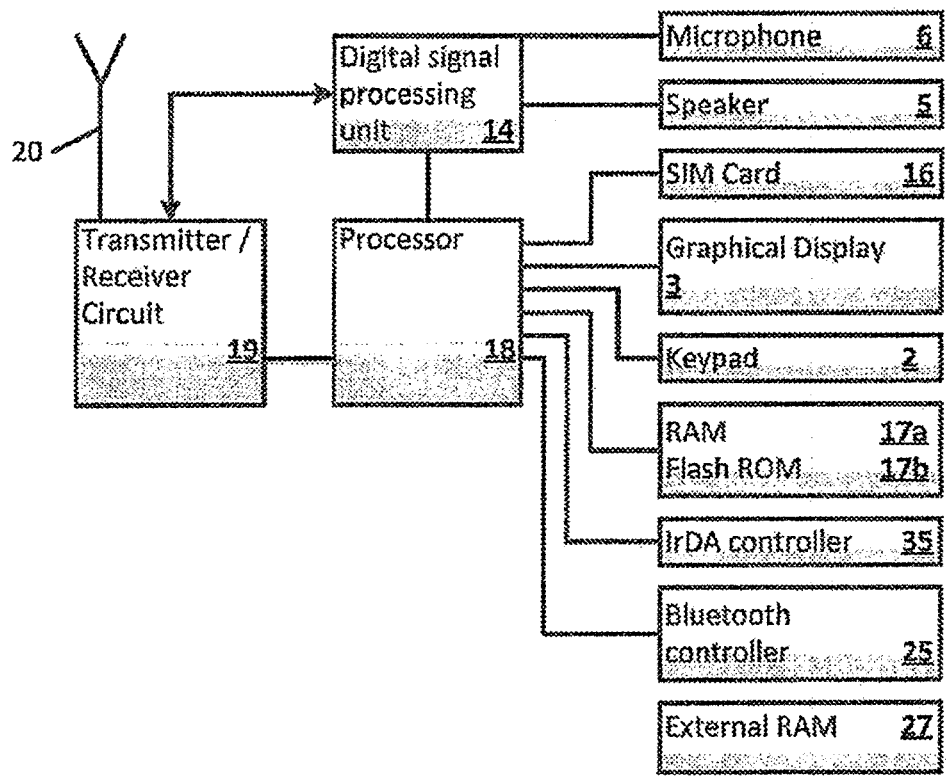

FIG. 9 illustrates a screenshot of yet another preferred embodiment of the invention, display 3. In this embodiment the simultaneous tasks are uploads. Upon initiation of each new upload an information window 80 is displayed. The information window 80 includes a title bar 81, and a list with all uploads currently in progress, paused or completed. The list includes two columns and shows (as far as the information is available) for each upload listed:

- the application shell icon 82, shown in the first column;
- the name of the file 83 being uploaded, shown in the right column;
- the upload progress 84 in percentage, shown in parenthesis below the name of the file; and
- the amount of uploaded data 85, below the name of the file 83.

One of the uploads in the list (default is the first listed upload) is highlighted. By pressing the "Up" and "Down" navigation key 10 the user can change the upload that is highlighted. When the information window 80 is the topmost window, the function of the softkeys 9 is "Options" and "Hide". The information window 80 covers a major part of the display 3. Pressing the right softkey 9 "Hide" sends the information window 80 to the background and allows the user to see and use other applications, i.e. the text editor of a document created earlier.

Pressing the left softkey "Options" calls a pop-up window (not shown) with a list of selectable items that includes the items "Pause/Resume" and "Cancel upload". The function of the softkeys 9 has changed to "OK" and "Cancel". Selecting "Pause/Resume" with the navigation key 10 and pressing the left softkey 9 "OK" pauses the highlighted upload when it was not already paused and resumes the highlighted upload when it was already paused. Pressing "Cancel" closes the pop-up window.

The user can recall the information window 80 when it is in the background. To do so, the user presses the left softkey 9 "Options", resulting in a list of selectable items being shown including "Tools". Selecting "Tools" and pressing the left softkey 9 "Select" results in another list with selectable menu items including the item "Uploads". Selecting "Uploads" calls the information window 80 back to the front.

When the status of a an upload changes, e.g. an upload finishes or an error occurs, a check is made if the information 80 window is presently the topmost window.

If information window 80 is visible indeed, no further action is taken.

If the information window 80 is not visible (i.e. is not the topmost window), a confirmation query "Filename: upload completed" or "Filename: error, upload cancelled" is shown. Simultaneously the function of the left softkey 9 changes to "Hide". The right softkey has no function in this situation. Pressing of the left softkey 9 "Hide" closes the confirmation query.

In one aspect the disclosed embodiments include a computer program product. The computer program product can include a computer useable medium. The computer useable medium can be configured to operate a user interface of a computer terminal running multiple simultaneous tasks that each go through one or more changes in status. In one embodiment, the computer readable medium can be configured to monitor the status of the tasks, present information regarding the status of the tasks via the user interface, determine if the information regarding the status of the task concerned is perceptible by a user when any of the tasks changes status, and present a separate confirmation indicating that the task concerned has changed status if the information regarding the status of the task concerned is not perceptible by the user when the task concerned changed status.

In one embodiment, the computer program product comprises means for controlling execution of a plurality of simultaneous applications that each can go through one or more changes in status, means for monitoring the status of said tasks, means for presenting information regarding the status of said tasks via the user interface, means for determining if said information regarding the status of the task concerned is perceptible by a user when any of the tasks changes status, and means for presenting a separate confirmation indicating that the task concerned has changed status if said information regarding the status of the task concerned is not perceptible by the user when the task concerned changes status.

The present invention is not limited to particular types of tasks. Further to the mentioned tasks other simultaneous tasks such as sending or receiving messages or tasks that run simultaneously on a computer terminal can be handled as described above.

Although the present invention has been described in detail for purpose of illustration, it is understood that such detail is solely for that purpose, and variations can be made therein by those skilled in the art without departing from the scope of the invention.

That which is claimed:

1. A method comprising:
   monitoring with a processor, statuses of multiple file downloads;
   causing display of the respective statuses for each of the multiple file downloads;
   causing display of at least one option for each of the multiple file downloads, each option enabling user control of the downloading of the associated file, wherein the at least one option comprises at least pausing, canceling, or resuming of the downloading of the associated file;
   in an instance the displayed respective statuses are perceivable by a user and a particular file download is completed, causing the particular file to be opened in response to completion of the download; and
   in an instance the displayed respective statuses are not perceivable by the user, causing the particular file to be opened only in response to a user indication.

2. The method of claim 1, wherein at least a portion of two of the multiple file downloads occur simultaneously.

3. The method of claim 1, wherein the at least one option comprises at least one of pausing or resuming downloading of the file.

4. The method of claim 1, further comprising:
   determining an amount available memory to which the files will be downloaded;
   estimating a size of at least one of the files; and
   in an instance the amount of available memory is not sufficient for completing any of the downloads, providing an indication that the amount of available memory is not sufficient.

5. The method of claim 4, wherein the memory to which the files will be downloaded is external to a device displaying the respective status for each of the multiple file downloads.

6. The method of claim 4, wherein determining the amount of available memory comprises:
   estimating file sizes of previously initiated file downloads in progress; and
   calculating an effectively available memory by adjusting the determined amount of available memory based on estimated sizes of previously initiated file downloads.

7. An apparatus comprising at least one processor and at least one memory including computer program code, the at least one memory and the computer program code configured to, with the processor, cause the apparatus to at least:
   monitor statuses of multiple files being downloaded;
   cause display of the respective statuses for each of the multiple file downloads;
   cause display of at least one option for each of the multiple file downloads, each option enabling user control of the downloading of the associated file, wherein the at least one option comprises at least pausing, canceling, or resuming of the downloading of the associated file;

in an instance the displayed respective statuses are perceivable by a user and a particular file download is completed, causing the particular file to be opened in response to completion of the download; and in an instance the displayed respective statuses are not perceivable by the user, causing the particular file to be opened only in response to a user indication.

8. The apparatus of claim 7, wherein at least a portion of two of the multiple file downloads occur simultaneously.

9. The apparatus of claim 7, wherein the at least one option comprises at least one of pausing or resuming downloading of the file.

10. The apparatus of claim 7, wherein the at least one memory and the computer program code are further configured to, with the processor, cause the apparatus to at least:

determine an amount of available memory to which the files will be downloaded;

estimate a size of at least one of the files; and in an instance the amount of available memory is not sufficient for completing any of the downloads, provide an indication that the amount of available memory is not sufficient.

11. The apparatus of claim 7, wherein the amount of available memory to which the files will be downloaded is an external memory to the apparatus.

12. The apparatus of claim 7, wherein determining the amount of available memory comprises:

estimating file sizes of previously initiated file downloads in progress; and calculating an effectively available memory by adjusting the determined amount of available memory based on estimated sizes of previously initiated file downloads.

13. A computer program product comprising at least one non-transitory computer-readable storage medium having computer-executable program code instructions stored therein, the computer-executable program code instructions comprising program code instructions to:

monitor statuses of multiple files being downloaded;

cause display of the respective statuses for each of the multiple file downloads;

cause display of at least one option for each of the multiple file downloads, each option enabling user control of the downloading of the associated file, wherein the at least one option comprises at least pausing, canceling, or resuming of the downloading of the associated file;

in an instance the displayed respective statuses are perceivable by a user and a particular file download is completed, cause the particular file to be opened in response to completion of the download; and in an instance the displayed respective statuses are not perceivable by the user, cause the particular file to be opened only in response to a user indication.

14. The computer program product of claim 13, wherein at least a portion of two of the multiple file downloads occur simultaneously.

15. The computer program product of claim 13, wherein the at least one option comprises at least one of pausing or resuming downloading of the file.

16. The computer program product of claim 13, wherein the computer-executable program code instructions comprise program code instructions to:

determine an amount of available memory to which the files will be downloaded;

estimate a size of at least one of the files; and in an instance the amount of available memory is not sufficient for completing any of the downloads, provide an indication that the amount of available memory is not sufficient.

17. The computer program product of claim 13, wherein the memory to which the files will be downloaded is external to a device displaying the respective status for each of the multiple file downloads.

18. The computer program product of claim 13, wherein determining the amount of available memory comprises:

estimating file sizes of previously initiated file downloads in progress; and calculating an effectively available memory by adjusting the determined amount of available memory based on estimated sizes of previously initiated file downloads.

* * * * *

UNITED STATES PATENT AND TRADEMARK OFFICE
CERTIFICATE OF CORRECTION

Page 1 of 2

PATENT NO. : 9,876,843 B2
APPLICATION NO. : 14/471347
DATED : January 23, 2018
INVENTOR(S) : Makela It is certified that error appears in the above-identified patent and that said Letters Patent is hereby corrected as shown below:

In the Drawings
FIG. 3A should be replaced with the attached FIG. 3A.

In the Claims
Column 11,
Lines 6 and 9, "causing", both occurrences, should read --cause--.

Signed and Sealed this
Third Day of July, 2018

Andrei Iancu
*Director of the United States Patent and Trademark Office*